Sept. 1, 1964      A. L. JOHNSON      3,147,003
FAST ACTION C-CLAMP
Filed Nov. 22, 1961
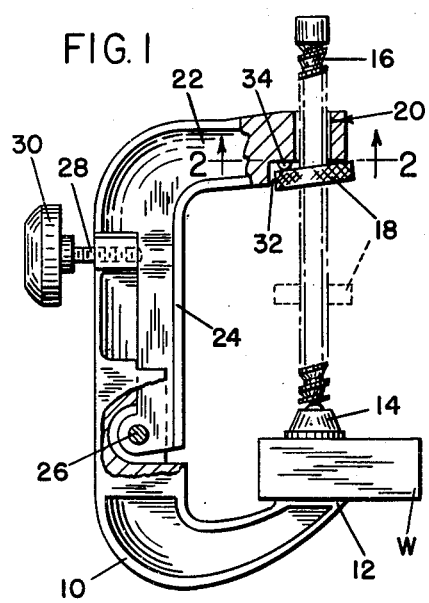
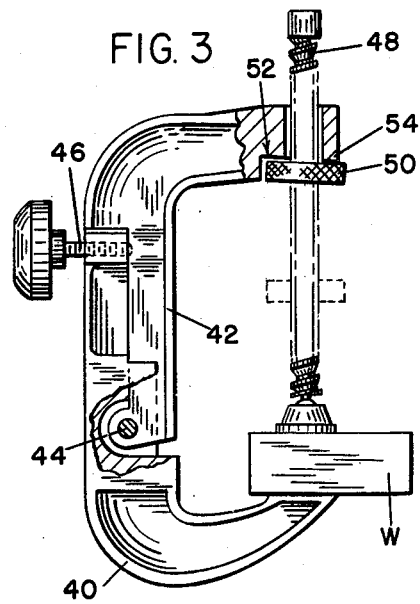
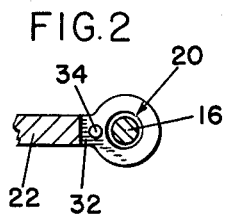
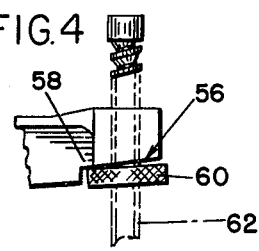
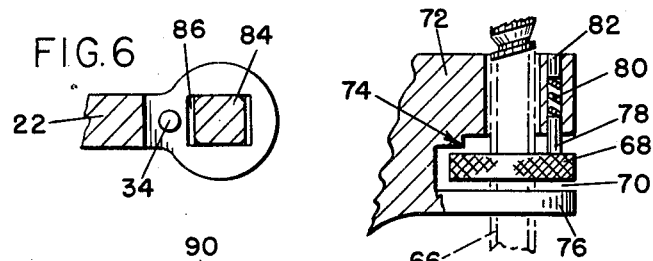
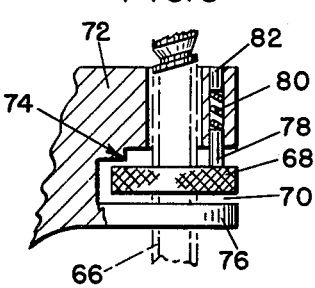
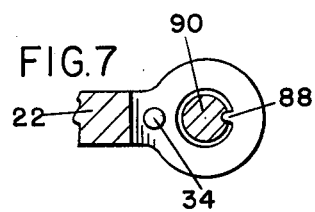
INVENTOR
ALVIN L. JOHNSON
by Charles R. Fay
ATTORNEY

United States Patent Office 3,147,003
Patented Sept. 1, 1964

3,147,003
FAST ACTION C-CLAMP
Alvin L. Johnson, 551 Chandler St., Worcester, Mass.
Filed Nov. 22, 1961, Ser. No. 154,124
6 Claims. (Cl. 269—167)

This invention relates to a fast action C-clamp including a screw-threaded member of the general nature described in my copending application Serial No. 115,239 filed June 6, 1961. The principal object of the present invention resides in the provision of means for locking the nut relative to the screw member in a fast action clamp such as described in said application so that there is no possibility of the nut and screw rotating in such a way as to loosen the clamp when this is not desired.

Further objects of the invention include the provision of a fast action clamp comprising two relatively movable parts, one of which has an anvil and the other of which provides an aperture for a screw-threaded rod which can slide through the aperture, there being a nut mounted on the rod, the threads of the rod being of relatively large pitch in the nature of from two to five threads per inch so that it will be seen that the nut is capable of being easily spun on the screw-threaded rod to very quickly translate it along the screw, and there being a special new and improved means for applying a cramping action to the nut when the parts are relatively moved to provide a clamping action between the end of the screw-threaded rod and the anvil, by which novel means the nut is fixedly held in position relative to the screw and cannot back off from the clamped position to loosen the work when such is undesired, and also providing for a swiveling motion of the entire clamp relative to the work, with the parts maintaining their position, and with no loosening thereof.

Other objects and advantages of the invention will appear hereinafter.

Reference is to be had to the accompanying drawings, in which

FIG. 1 is a view in side elevation with parts in section illustrating a form of the invention;

FIG. 2 is a section on line 2—2 of FIG. 1;

FIG. 3 is a view similar to FIG. 1 showing a modification;

FIG. 4 is a partial view also similar to FIG. 1 showing another modification;

FIG. 5 is a view similar to FIG. 4 showing a further modification, and

FIGS. 6 and 7 are views similar to FIG. 2 showing modifications.

Referring now to FIG. 1 there is shown a clamp of the general nature of an adjustable C-clamp comprising a frame member 10 provided with an anvil or the like 12 for the clamping reception of a workpiece W between the anvil 12 and a foot or the like 14 swivelly mounted at the end of a screw 16. This screw has an extremely large pitch in the nature of two to five threads per inch and it is provided with a nut 18 which is extremely fast in longitudinal translation along the screw 16 when it is spun with the finger due to the large pitch.

The screw 16 is loosely mounted in an aperture as at 20 which extends through an arm 22 mounted on a clamp member 24 pivoted at 26 with respect to the clamp member 10. The arm 22 may be urged toward the anvil on clamp member 10 about the axis of pin 26 by means of a screw-threaded member 28 having an actuating head 30 for this purpose.

Underneath arm 22 there may be provided a cut-out portion at 32 in which the nut 18 may be received in clamping position of the parts, and downwardly extending from the surface of this cut-out portion there is a fixed projection 34 against which the upper flat surface of nut 18 will abut in clamping position of the parts.

The action of this construction is as follows: The screw 16 can quickly fall by gravity and lightly clamp workpiece W against the anvil. The nut is then spun to move upwards to engage the projection 34, and with the parts in this position the thumbpiece 30 of the screw-threaded member 28 is turned to urge the arm 22 in an arc toward anvil 12. Hence the projection 34 forms a pressure point and impinges tightly on the nut 18 in the solid line position of FIG. 1 and cramps it against the threads in the screw. It is preferred that the screw-threads 16 should be buttress threads although this is not necessary and in any event the cramping action of projection 34 ensures that the nut is solidly clamped to the screw so that regardless of the clamping pressure thereafter provided the nut 18 will not tend to rotate down the screw as would be the case otherwise where an extremely large thread pitch is utilized. If the pitch of the thread is relatively fine, then the projection 34 is not necessary because the nut will not tend to move down the screw when the clamping pressure by member 30 is applied, but with the fine pitch the nut of course takes longer to travel to its clamping position, so that it is desirable to have a relatively large coarse pitch. However, in some cases with such a large pitch, the nut being under pressure, tends to rotate upon motion of the arm 22 toward the anvil 12, but with the projection 34, eccentric to the axis of the screw, this is impossible due to the cramping action shown in FIG. 1, this being somewhat exaggerated in order to illustrate it.

Other modifications of this invention are disclosed herein as in FIG. 3. The clamp part 40 is pivotally arranged with respect to clamp part 42 as before on a pin 44 with a threaded member 46 similar to that at 30 and for the same purpose. The screw-threads are shown at 48 and the nut at 50. In this case there is no projection, but the undercut portion 32 in FIG. 1 is made on an incline with respect to the axis of the screw 16 as is indicated by the surface 52, leaving a pressure point at 54. The action will be seen to be the same as before except that instead of having an actual projection, there is instead a pressure point provided by a small part of the relatively inclined surface 52.

This inclined surface 52 can be reversed as shown at 56 in FIG. 4, leaving a pressure point 58 at the opposite side of the nut 60, the screw being shown at 62. However, the action is just the same as before stated and is for the same reason, i.e., that only a very small portion of the nut is engaged by a pressure point which is clearly eccentric to the axis of the screws 16, 48 and 62, this being the only part to impinge on the nut, causing the same to be cramped or tilted with respect to the axis of the respective screws so as to provide the locked clamping action aforesaid.

A further modification is shown in FIG. 5. In this case the screw is indicated at 66 and it is in engagement with the nut 68. The nut 68 is mounted in a slot 70 in the clamp member 72 but is provided with a pressure point 74 which may be similar to those shown in FIGS. 2 and 3. However, the slot at 70 provides an abutment 76 which of course traps the nut 68 and it cannot move downwardly as is indicated in FIGS. 1 and 2 although it is tilted in the same way and for the same reasons.

Furthermore, there is provided a pin 78 which is spring-pressed outwardly of the member 72 by a spring 80 and the spring 80 is held in position by an insert or pin 82. The pin 78 impinges upon the top surface of the nut 68 and maintains the same in parallelism with a plane at right angles to the axis of the screw 66 except when the member 72 is moved by some means comparable to the thumbpiece 30 of FIG. 1 to clamp the foot of the screw 66 against the anvil. When this happens of course the nut 68 is cramped and locked in position as before, but when the pressure is released, the nut 68 can be utilized to cause the screw to move upwardly at any time, and this can only be done of course in FIGS. 1 and 2 when the nut 18 is in its upwardmost position and cannot do it then when it is cramped. The screw, however, can fall by gravity while rotated by the nut 68, in both directions, due to the great pitch provided, so that the advantages of the other forms are in some degree retained in FIG. 5 with the additional advantage of the operator being able to run the screw 66 upwardly at any time when the pressure is released.

Further modifications are illustrated in FIGS. 6 and 7 and in these instances the reference numeral 22 indicates the member as in FIG. 2 and the projection 34 is the same as before. However, the screw shaft at 84 is a square shaft threaded on the corners and engages with the nut as before but in this case grooves rectilinearly in a square hole 86 so that the square screw shaft 84 cannot rotate. In all other respects, however, it is the equivalent of the shaft 16.

In FIG. 7 there is a spline provided at 88, this spline being integral with the portion 22 and entering a corresponding slot in the screw shaft 90 which is otherwise the same as screw shaft 16. This is another way of preventing rotation of the screw shaft which is engaged with nut 18 or nut 68 should it be desired to prevent such rotation. It is pointed out that in some cases it may be better not to allow the screw shaft to rotate so that when the nut is turned, the screw shaft must be translated rectilinearly rather than allowing the possibility that the screw shaft as in FIG. 1 might turn with the nut, thus failing to accomplish its purpose of rectilinear motion and clamping.

Having thus described my invention and the advantages thereof, I do not wish to be limited to the details herein disclosed, otherwise than as set forth in the claims, but what I claim is:

1. A fast action clamp comprising a pair of clamp members, an anvil on one of said members, an opening in the other member in line with the anvil, a screw slidingly associated with the other member and located in the opening thereof for free motion toward and from said anvil, a nut on said screw, means on one member for applying clamping pressure to the other of said pair of clamp members, means forming a pressure point on said other clamp member adjacent the opening therein, said pressure point means being applied to said nut when engaged therewith for cramping said nut relative to said screw and locking the nut and the screw together in clamping position of the anvil and screw, and means maintaining said nut in operative position to move said screw by rotation of the nut when the pressure point means is not applied to the nut.

2. The fast action clamp of claim 1 wherein said last-named means comprises a member on the other clamp member preventing the nut from moving downwardly relative to the screw.

3. The fast action clamp of claim 1 wherein said last-named means includes a spring-pressed member engaging the surface of the nut diametrically opposite with respect to the screw from the pressure point means.

4. The fast action clamp of claim 1 including means preventing rotation of the screw.

5. The fast action clamp of claim 1 wherein said screw is square in section and said opening in the other member is correspondingly square to prevent rotation of the screw.

6. The fast action clamp of claim 1 including interengaging means between said other member and said screw preventing rotation of said screw.

References Cited in the file of this patent

UNITED STATES PATENTS

| 339,072 | Nies | Mar. 30, 1886 |
| 900,796 | Tamling | Oct. 13, 1908 |
| 1,804,007 | Golnick | May 5, 1931 |
| 2,156,195 | Robillard | Apr. 25, 1939 |
| 2,472,022 | Neal | May 31, 1949 |
| 2,755,681 | Merriman | July 24, 1956 |
| 2,828,662 | Antal | Apr. 1, 1958 |
| 2,947,333 | Johnson | Aug. 2, 1960 |
| 2,949,140 | Larson | Aug. 16, 1960 |

FOREIGN PATENTS

| 262,804 | Germany | July 23, 1913 |
| 910,255 | France | Jan. 21, 1946 |
| 1,033,073 | France | Apr. 1, 1953 |